United States Patent [19]

Partos

[11] 3,906,104

[45] Sept. 16, 1975

[54] INSECTICIDAL SULFONATES

[75] Inventor: Richard D. Partos, Brentwood, Mo.

[73] Assignee: Monsanto Company, St. Louis, Mo.

[22] Filed: Mar. 14, 1974

[21] Appl. No.: 450,960

Related U.S. Application Data

[62] Division of Ser. No. 17,902, March 9, 1970, Pat. No. 3,818,102.

[52] U.S. Cl. ............................................... 424/303
[51] Int. Cl.² .......................................... A01N 9/14
[58] Field of Search .................................... 424/303

[56] References Cited
UNITED STATES PATENTS

| | | | |
|---|---|---|---|
| 2,485,095 | 10/1949 | Harris et al. | 424/303 |
| 3,179,684 | 4/1965 | Covey et al. | 424/303 |

FOREIGN PATENTS OR APPLICATIONS

| | | |
|---|---|---|
| 951,741 | 3/1964 | United Kingdom |

*Primary Examiner*—V. D. Turner
*Attorney, Agent, or Firm*—Richard H. Shear

[57] ABSTRACT

Substituted aryl alkane sulfonates having insecticidal properties.

16 Claims, No Drawings

INSECTICIDAL SULFONATES

This is a division of application Ser. No. 17,902, filed Mar. 9, 1970, now U.S. Pat. No. 3,818,102.

This invention relates to new and useful aryl alkane sulfonates and the insecticidal compositions containing at least one of them. The compounds of this invention can be represented by the formula

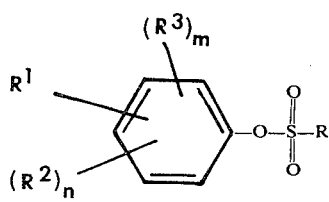

wherein $m$ and $n$ are integers from 0 through 4 with a maximum sum of 4; R is alkyl, haloalkyl, having from 1 through 18 carbon atoms, alkenyl or haloalkenyl having from 2 through 18 carbon atoms, aralkyl having from 7 through 11 carbon atoms; $R^1$, $R^2$ and $R^3$ are hydrogen, alkyl, alkoxy or thioalkyl having from 1 through 6 carbon atoms, $RSO_2$, cyano, nitro, trifluoromethyl, carboxy, acetyl, acetoxy or carboxamine with a maximum of 2 of $R^1$, $R^2$ and $R^3$ being hydrogen. When two of the ring substituents are hydrogen, and the other is alkyl, the total number of carbon atoms in the ring substituents is in excess of 2.

The alkyl substituents in these compounds can be methyl, ethyl, normal propyl, isopropyl, normal butyl, secondary butyl, tertiary butyl, normal pentyl, isopentyl, and the various forms of hexyl, heptyl, octyl, nonyl, decyl, undecyl, dodecyl, tridecyl, tetradecyl, pentadecyl, hexadecyl, heptadecyl, and octadecyl.

The compounds of the present invention can be readily prepared by the reaction of an appropriate substituted phenol with an alkane- or haloalkane sulfonylchloride in the presence of an acid acceptor such as an amine. The preparation of these compounds is illustrated by the following examples.

EXAMPLE 1

About 50 grams of 3-methyl-4-cyanophenol was introduced into a suitable reaction vessel provided with means for agitation. The phenol was dissolved in 100 ml. of diethyl ether and about 38 grams of triethylamine. To this solution was added approximately 43 grams of methanesulfonylchloride and the reaction mixture was stirred for approximately 3 hours. The reaction mixture was then washed with water and the organic layer separated. After drying over magnesium sulfate, filtering, and evaporation, the residue solidified upon cooling and was recrystallized from carbon tetrachloride to obtain a solid having a melting point of 75°–78°C. The product, 4-cyano-3-methylphenyl methanesulfonate, was analyzed with the following results: Calc'd. for $C_9H_9NO_3S$. Theory — 51.17%C, 4.29%H. Found — 51.13%C, 4.23%H.

EXAMPLE 2

About 7.3 grams of 3-hydroxybenzotrifluoride was introduced into a suitable reaction vessel having means for agitation. The compound was then dissolved in approximately 150 ml. of diethyl ether. About 5.7 grams of methanesulfonyl chloride and about 5.0 grams of triethylamine were then added and stirred for 12 hours at which time the reaction was substantially complete. The reaction mixture was washed with water and with ether, dried and condensed to obtain an oil which solidified on cooling to provide a solid having a melting point of 30°–32°C. The product, 3-trifluoromethylphenyl methanesulfonate, gave the following analysis: Calc'd for: $C_8H_7F_3O_3S_1$. Theory — 40.0%C, 2.94%H. Found — 40.36%C, 3.09%H.

Other compounds of the present invention that can be prepared in substantially the same manner using properly substituted reactants include:
4-nitrophenyl methanesulfonate
2,4-dinitrophenyl methanesulfonate
3-isopropyl-4-nitrophenyl methanesulfonate
3-isopropyl-4-cyanophenyl methanesulfonate
3,4,5-trimethylphenyl methanesulfonate
3-isopropylphenyl methanesulfonate
3,4-diethylphenyl methanesulfonate
3-methyl-4-nitrophenyl methanesulfonate
3-nitrophenyl methanesulfonate
4-cyanophenyl methanesulfonate
3-methyl-4-cyanophenyl methanesulfonate
3-cyano-4,6-dinitrophenyl methanesulfonate
3,5-dicyanophenyl methanesulfonate
3-trifluoromethylphenyl methanesulfonate
3-trifluoromethylphenyl trifluoromethanesulfonate
3-n-propyl-4-cyanophenyl-n-propanesulfonate
3-isopropyl-4-n-propylphenyl isopropanesulfonate
3-isopropyl-4-cyanophenyl-t-butanesulfonate
3,4,5-triethylphenyl methanesulfonate
3,4,5-trichloromethylphenyl secondary butanesulfonate
2-methyl-4-cyano-5-isopropylphenyl methanesulfonate
2-isopropyl-4-cyano-5-methylphenyl methanesulfonate
2-cyano-5-isopropylphenyl methanesulfonate
2-cyano-4-isopropylphenyl methanesulfonate
3,5-dimethyl-4-cyanophenyl methanesulfonate
2-isopropyl-4-cyanophenyl methanesulfonate
3-t-butyl-4-cyanophenyl methanesulfonate
3-isopentyl-4-cyanophenyl methanesulfonate
3-isopropyl-4-acetylphenyl methanesulfonate
3-isopropyl-4-carboxyphenyl methanesulfonate
3-isopropyl-4-acetoxyphenyl methanesulfonate
3-isopropyl-4-carboxamidephenyl methanesulfonate
2-acetyl-5-isopropylphenyl methanesulfonate
2-carboxy-5-isopropylphenyl methanesulfonate
2-acetoxy-5-isopropylphenyl methanesulfonate
2-carboxamide-5-isopropylphenyl methanesulfonate
3-isopropyl-4-cyanophenyl decanesulfonate
3-isopropyl-4-cyanophenyl hexadecanesulfonate
3-isopropyl-4-cyanophenyl octadecanesulfonate
3-isopropyl-4-cyanophenyl benzylsulfonate
3-isopropyl-4-cyanophenyl chlorobenzylsulfonate
3-isopropyl-4-cyanophenyl methoxybenzylsulfonate
3-isopropyl-4-cyanophenyl nitrobenzylsulfonate The terms "insect" and "insecticide" are used herein in their broad common usage to include spiders, mites, ticks, and like pests which are not in the strict biological sense classed as insects. Thus, the term "insect" is used to refer not only to those small invertebrate animals belonging mostly to the class Insecta, comprising six-legged, usually winged forms, as beetles, bugs, bees, flies, and so forth, but also to other allied classes of arthropods whose members are wingless and usually have more than six legs, as spiders, mites, ticks, centipedes, millipedes, and wood lice.

In order to demonstrate the utility of the compound of this invention against corn root worm larvae, aryl alkyl sulfonates of this invention were incorporated into soil containing corn root segments and the soil was infested with western corn root worm larvae. The soil was then maintained for 48 hours at 25°C. and the larval mortality determined. A 100% mortality rate was obtained with soil containing 6 ppm of 3-isopropyl-4-cyanophenyl methanesulfonate. In repetitions of this procedure, 100% larval mortality rates were also obtained when 3,4,5-trimethylphenyl methanesulfonate and 3-isopropyl-4-cyanophenyl ethanesulfonate were used as the active component.

The compounds under consideration are also effective against the boll weevil and the bollworm. For example, when 3-isopropyl-4-cyanophenyl methanesulfonate was sprayed on cotton plants at the rate of 10 lbs. per acre, a 100% kill of boll weevil was obtained and a 60% kill of bollworm.

The utility of the compounds of this invention to destroy cattle ticks (*Boophilus microplus*), which are parasitic to domestic animals in general, and to cattle in particular, is illustrated by the following procedure. In this procedure, 3-isopropyl-4-cyanophenyl methanesulfonate was dissolved in a trichloroethylene-olive oil mixture and impregnated in chromatagraphic paper. The trichloroethylene is permitted to evaporate, leaving only olive oil and the sulfonate on the paper. The unfed larval ticks (*Boophilus microplus*) were exposed to the compound by contact with the treated surfaces.

The 3-isopropyl-4-cyanophenyl methanesulfonate was added to the mixture to provide a solution or suspension in which the concentration of the compound in the olive oil was 1.12% (i.e., 1.12 grams of compound in 100 ml. of olive oil). Portions of this stock solution were then diluted to provide solutions of 0.07, 0.035, 0.017, 0.008, 0.004, 0.002 and 0.001 percents respectively.

The chromatographic paper was cut into rectangles of 9 cm. by 7.5 cm. Each of the rectangular papers was then supported horizontally by four pins and a 0.67 ml. portion of the sulfonate solution was run on to each of the papers. The papers were then dried, evaporating the trichloroethylene, thus leaving the olive oil with the active ingredient impregnated in the paper. The papers were then formed into packets with a clip. This left one end open. One hundred larvae were introduced into each packet and the opening closed with a clip. After 48 hours at room temperature, the packets were opened and the number of larvae alive and dead were counted.

In accordance with this procedure, a strain of cattle ticks susceptible to known acaricides and a strain of cattle ticks resistant to them were exposed to the 3-isopropyl-4-cyanophenyl methanesulfonate. The procedure was also conducted using a commercially available acaricide, 0,0-diethyl-3,5,6-trichloro-2-pyridyl phosphorothioate. The results obtained, expressed as percentage kill of the larvae, are set forth below.

In actual practice, the sulfonates are usually formulated into a cattle dip in which the cattle to be protected are immersed. Such dips are prepared by dissolving the sulfonates, with or without other pesticides, in a water-immiscible solvent system and a sufficient quantity of one or more emulsifying agents is added to insure the formation of a stable aqueous emulsion. Water is then added to the emulsifiable concentrate to form an emulsion containing from about 0.01% to about 1.0% of the active ingredients.

A typical cattle dip concentrate in accordance with this invention has the following approximate composition by weight:

| | |
|---|---|
| 3-isopropyl-4-cyanophenyl methanesulfonate | 10% |
| Sodium dodecylbenzene sulfonate | 5% |
| Polyoxyethylene sorbitan condensate | 10% |
| High-boiling aromatic petroleum fraction | 25% |
| Cyclohexanone | 50% |

When added to water at the rate of one gallon of concentrate to about 100 gallons of water, a stable emulsion containing about 0.1% by weight of the sulfonate is obtained. It has been found that cattle infested with cattle ticks and immersed in, or sprayed with, such an acaricide are completely devoid of ticks within a relatively short period of time.

Although the compounds of this invention are useful per se in controlling a wide variety of insect pests, it is preferable that they be supplied to the pests or to the environment of the pests in a dispersed form in a suitable extending agent.

The term "dispersed" is used herein in its widest possible sense. Particles of the compounds may be molecular in size and held in true solution in a suitable organic solvent, or the particles may be colloidal in size and distributed throughout a liquid phase in the form of suspensions or emulsions, or in the form of particles held in suspension by wetting agents. The term includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the compounds of this invention in a carrier such as dichlorodifluoromethane and the like which boil below room temperature at atmospheric pressure.

The expression "extending agent" as used herein includes insecticidal adjuvants and any and all of the substances in which the compounds of this invention are

| Acaricide | Ticks | Concentration (%) | | | | | | |
|---|---|---|---|---|---|---|---|---|
| | | 0.07 | 0.035 | 0.017 | 0.008 | 0.004 | 0.002 | 0.001 |
| Sulfonate of this invention | Susceptible | 100 | 100 | 100 | 100 | 100 | 100 | 100 |
| | Resistant | 100 | 100 | 100 | 100 | 100 | 0 | 0 |
| Commercial Product | Susceptible | 100 | 100 | 100 | 14 | 0 | 0 | 0 |
| | Resistant | 100 | 0 | 0 | 0 | 0 | 0 | 0 | dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the compounds of this invention employed in combatting or controlling insect pests can vary considerably provided the required dosage (i.e., toxic or lethal amount) thereof is supplied to the pests or to the environment of the pests. When the extending agent is a liquid or mixture of liquids (e.g., as in solutions, suspensions, emulsions, or aerosols) the concentration of the active compound employed to supply the desired dosage generally will be in the range of 0.0001 to 50% by weight. When the extending agent is a semi-solid or solid, the concentration of the insecticide employed to supply the desired dosage generally will be in the range of 0.1 to 75% by weight. From a practical point of view, the manufacturer must supply the user with a concentrate in such form that, by merely mixing with water or solid extender (e.g. powdered clay or talc) or other low-cost material available to the user at the point of use, he will have an easily prepared insecticidal spray or particulate solid. In such a concentrate composition, the insecticide generally will be present in a concentration of 5 to 95% by weight, the residue being any one or more of the well-known insecticidal adjuvants, such as the various surface active agents (e.g. detergents, a soap or other emulsifying or wetting agents), surface-active clays, solvents, diluents, carrier media, adhesives, spreading agents, humectants, and the like.

There are a large number of organic liquids which can be used alone or in combination for the preparation of solutions, suspensions or emulsions of the phosphonates of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalene, solvent naphtha, benzene, toluene, xylene, petroleum fractions (e.g. those boiling almost entirely under 400°F. at atmospheric pressure and having a flash point above about 80°F., particularly kerosene), mineral oils having an unsulfonatable residue above about 80% and preferably above about 90%. In those instances wherein there may be concern about the phytotoxicity of the organic liquid extending agent a portion thereof can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like.

The insecticides of this invention are preferably supplied to the insect pests or to the environment of the insect pests in the form of emulsions or suspensions. Emulsions or suspensions are prepared by dispersing the compounds either per se or in the form of an organic solution thereof in water with the aid of a water-soluble surfactant. The term "surfactant" as employed herein is used as in volume II of Schwartz, Perry and Berch's "Surface Active Agents and Detergents" (1958, Interscience Publishers Inc., New York) in place of the expression "emulsifying agent" to connote generically the various "emulsifying agent", "dispersing agents", "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides", second edition, page 280). These surfactants include the well-known capillary-active substances which may be anionic, cationic, or non-ionic which are described in detail in volumes I and II of Schwartz, Perry and Berch's "Surface Active Agents and Detergents" (1958, Interscience Publishers, Inc., New York) and also in the November, 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents". The disclosures of these articles with respect to surfactants are incorporated in this specification by reference in order to avoid unnecessary enlargement of this specification. The preferred surfactants are the water-soluble anionic nonionic surface-active agents set forth in U.S. Pat. No. 2,846,398 (issued Aug. 5, 1958). In general, a mixture of water-soluble anionic and water-soluble non-ionic surfactants is preferred.

The compounds of this invention can be dispersed by suitable methods (e.g. tumbling or grinding) in solid extending agents either of organic or inorganic nature and supplied to the insect pests' environment in particulate form. Such solid materials include for example, tricalcium phosphate, calcium carbonate, kaolin, bole, kieselguhr, talc, bentonite, attapulgite, fuller's earth, pyrophillite, diatomaceous earth, calcined magnesia, volcanic ash, sulfur and the like inorganic solid materials as well as organic materials such as powdered cork, corn husks, corn cobs, powdered wood, and powdered walnut shells. The preferred solid carriers are the adsorbent clays, e.g. bentonite. These mixtures can be used for insecticidal purposes in the dry form, or by addition of water-soluble surfactants or wetting agents the dry particulate solids can be rendered wettable by water so as to obtain stable aqueous dispersions or suspensions suitable for use as sprays.

For special purposes the compounds of this invention can be dispersed in a semi-solid extending agent such as petroleum or soap (.e.g sodium stearate or oleate or palmitate or mixtures thereof) with or without the aid of solubility promoters and/or surfactants or dispersing agents.

In all of the forms described above, the dispersions can be provided ready for use in combatting insect pests or they can be provided in concentrated form suitable for mixing with or dispersing in other extending agents. As illustrative of a particularly useful concentrate is an intimate mixture of a compound of this invention with a water-soluble surfactant in the weight proportions of 0.1 to 15 parts of surfactant with sufficient sulfonate to make 100 parts by weight. Such as concentrate is particularly adapted to be made into a spray for combatting various forms of insect pests by the addition of water thereto.

Another useful concentrate adapted to be made into a spray for combatting a variety of insect pests is a solution (preferably as concentrated as possible) of a compound of this invention in an organic solvent therefor.

The said liquid concentrate preferably contains dissolved therein a minor amount (e.g. 0.5 to 10% by weight of the weight of the new insecticidal agent) of a water-soluble surfactant (or emulsifying agent).

Of the surfactants aforementioned in preparing the various emulsifiable, wettable or dispersible compositions or concentrates of this invention, the anionic and non-ionic surfactants are preferred. Of the anionic surfactants, the particularly preferred are the well known water-soluble alkali metal alkyl-aryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of hexitol anhydrides (e.g. sorbitan). These materials in general contain 15 to 30 moles of ethylene oxide per mole of the hexitol anhydride or the alkylphenol.

The compositions of this invention can also contain other additaments such as fertilizers and pesticides used as, or in combination with, the carrier materials. For example, the insecticides useful in combination with the above described compounds include parathion, methyl parathion, pyrethrine, nicotine, aldrin, chlordane, heptachlor, toxaphene, malathion, 2-isopropoxyphenyl N-methylcarbamate, 0,0,0,0-tetramethyl 0,0'-thiodi-p-phenylene phosphorothioate, dimethyl phosphate of 3-hydroxy-N-methyl-cis-crotonamide, fenthion, carbofuran, mirex, DDT, dicofol, methoxychlor, dichlorvos, demeton, dimethoate, carbophenothion, ronnel, carbaryl, azinphosmethyl, methomyl, aldicarb and the like.

In controlling or combatting insect pests the compounds of this invention either per se or compositions containing them are supplied to the insect pests or to their environment in a lethal or toxic amount. This can be done by dispersing the new insecticidal agent or insecticidal composition comprising same in, on or over an infested environment or in, on, or over an environment the insect pests frequent, e.g. agricultural soil or other growth media or other media infested with insect pests or attractable to the pests for habitational or sustenance or propagational purposes, in any conventional fashion which permits contact between the insect pests and the compounds of this invention. Such dispersing can be brought about by applying sprays, dips or particulate solid compositions to a surface infested with the insect pests or attractable to the pests as for example, animals such as sheep and cattle, the surface of an agricultural soil or other media such as the above ground surface of plants by any of the conventional methods, e.g. power dusters, boom and hand sprayers, and spray dusters. Also for sub-surface application such dispersing can be carried out by simply mixing the new insecticidal agent per se or insecticidal spray of particulate solid compositions comprising same with the infested environment or with the environment the insect pests frequent, or by employing a liquid carrier for the new insecticidal agent to accomplish subsurface penetration and impregnation therein.

While this invention has been described with respect to certain embodiments, it is to be understood that it is not so limited and that variations and modifications thereof obvious to those skilled in the art can be made without departing from the spirit and scope thereof.

What is claimed is:

1. An insecticidal composition comprising a carrier and an insecticidally effective amount of 2,4-dinitrophenyl methane sulfonate.

2. An insecticidal composition comprising a carrier and an insecticidally effective amount of 3-isopropylphenyl methanesulfonate.

3. An insecticidal composition comprising a carrier and an insecticidally effective amount of 3,4,5-trimethylphenyl methanesulfonate.

4. An insecticidal composition comprising a carrier and an insecticidally effective amount of 3-isopropyl-4-nitrophenyl methanesulfonate.

5. A method of combatting insects which comprises contacting said insects with a toxic amount of 2,4-dinitrophenyl methanesulfonate.

6. A method of combatting insects which comprises contacting said insects with a toxic amount of 3-isopropylphenyl methanesulfonate.

7. A method of combatting insects which comprises contacting said insects with a toxic amount of 3,4,5-trimethylphenyl methanesulfonate.

8. A method of combatting insects which comprises contacting said insects with a toxic amount of 3-isopropyl-4-nitrophenyl methanesulfonate.

9. A method of combatting soil-borne insects which comprises introducing into the soil a toxic amount of 2,4-dinitrophenyl methanesulfonate.

10. A method in accordance with claim 9 wherein said insects are corn rootworms.

11. A method of combatting soil-borne insects which comprises introducing into the soil a toxic amount of 3-isopropylphenyl methanesulfonate.

12. A method in accordance with claim 11 wherein said insects are corn rootworms.

13. A method of combatting soil-borne insects which comprises introducing into the soil a toxic amount of 3,4,5-trimethylphenyl methanesulfonate.

14. A method in accordance with claim 13 wherein said insects are corn rootworms.

15. A method of combatting soil-borne insects which comprises introducing into the soil a toxic amount of 3-isopropyl-4-nitrophenyl methanesulfonate.

16. A method in accordance with claim 15 wherein said insects are corn rootworms.

* * * * *